US011219333B2

(12) United States Patent
Fung et al.

(10) Patent No.: US 11,219,333 B2
(45) Date of Patent: Jan. 11, 2022

(54) WIRELESS TEMPERATURE SENSING SYSTEM FOR A COOKING APPLIANCE

(71) Applicant: CONAIR CORPORATION, Stamford, CT (US)

(72) Inventors: Kam Fai Fung, Hong Kong (CN); Kin Man Lai, Hong Kong (CN)

(73) Assignee: Conair LLC, Stamford, CT (US)

( * ) Notice: Subject to any disclaimer, the term of this patent is extended or adjusted under 35 U.S.C. 154(b) by 203 days.

(21) Appl. No.: 13/957,838

(22) Filed: Aug. 2, 2013

(65) Prior Publication Data

US 2015/0037471 A1     Feb. 5, 2015

(51) Int. Cl.
*A23L 5/10*     (2016.01)
*A47J 37/06*     (2006.01)
*A47J 36/32*     (2006.01)

(52) U.S. Cl.
CPC ............ *A47J 37/0611* (2013.01); *A23L 5/10* (2016.08); *A47J 36/321* (2018.08); *A47J 2202/00* (2013.01); *G01K 2207/06* (2013.01)

(58) Field of Classification Search
CPC .. A23L 5/10; A47J 36/32; A47J 36/321; A47J 37/06; A47J 37/0611; A47J 37/0617; A47J 2202/00; G01K 2207/02; G01K 2207/06
USPC ................. 426/231, 521; 99/343, 344, 331
See application file for complete search history.

(56) References Cited

U.S. PATENT DOCUMENTS

| 2,033,060 | A | 3/1936 | Anderson |
| 2,057,501 | A | 10/1936 | Parr |
| 2,607,287 | A | 8/1952 | Price |
| 2,719,903 | A | 10/1955 | Oertli |
| 4,036,995 | A | 7/1977 | Koether et al. |
| 4,088,067 | A | 5/1978 | Kaebitzsch et al. |
| 4,206,345 | A | 6/1980 | Maass et al. |
| 4,697,504 | A | 10/1987 | Keating |
| 5,237,914 | A | 8/1993 | Carstensen |
| 5,467,696 | A | 11/1995 | Everhart |
| 5,531,155 | A | 7/1996 | Pellicane et al. |
| 5,712,466 | A | 1/1998 | Spicer |
| 5,758,568 | A | 6/1998 | Moravec |
| 5,848,567 | A | 12/1998 | Chiang |
| 5,992,302 | A | 11/1999 | Geisler |
| 6,062,130 | A | 5/2000 | Brady |
| D436,498 | S | 1/2001 | Carlson et al. |
| 6,389,959 | B1 | 5/2002 | Robertson |
| 6,439,108 | B1 | 8/2002 | Wu |
| RE37,988 | E | 2/2003 | Uss |
| 6,539,842 | B1 * | 4/2003 | Chapman et al. ............. 99/342 |

(Continued)

OTHER PUBLICATIONS

RF vs IR NPL,http://trace.wisc.edu/docs/ir_intro/ir_intro.htm, 1995.*

*Primary Examiner* — Drew E Becker
*Assistant Examiner* — Austin Parker Taylor
(74) *Attorney, Agent, or Firm* — Grogan, Tuccillo & Vanderleeden, LLP

(57) ABSTRACT

A temperature sensing system for a cooking appliance includes a control unit having a receiver. The control unit and the receiver are housed within the cooking appliance. The temperature sensing system further includes a wireless temperature sensing probe having a temperature sensor and a wireless transmitter module. The wireless temperature sensing probe is configured to wirelessly communicate with the control unit housed within the cooking appliance.

15 Claims, 1 Drawing Sheet

(56) References Cited

U.S. PATENT DOCUMENTS

| | | | |
|---|---|---|---|
| 6,591,740 B1 | 7/2003 | Hsu | |
| 6,595,116 B1 | 7/2003 | Lin | |
| 6,636,836 B1 * | 10/2003 | Pyo | 705/7.29 |
| 6,705,306 B1 | 3/2004 | Dickey | |
| 7,514,655 B2 | 4/2009 | Fernandez et al. | |
| 7,608,803 B2 | 10/2009 | Jerovsek | |
| 7,717,028 B2 | 5/2010 | Serra | |
| 8,122,816 B2 | 2/2012 | Yu | |
| 8,261,657 B2 | 9/2012 | Serra et al. | |
| 2004/0074398 A1 | 4/2004 | Griffin et al. | |
| 2005/0139086 A1 * | 6/2005 | McHutchison | 99/389 |
| 2007/0131670 A1 * | 6/2007 | Nam et al. | 219/403 |
| 2007/0247113 A1 * | 10/2007 | Huang | 320/114 |
| 2009/0165774 A1 | 7/2009 | Johnston et al. | |
| 2009/0188396 A1 * | 7/2009 | Hofmann et al. | 99/342 |
| 2010/0012645 A1 * | 1/2010 | Baier | 219/413 |
| 2012/0137897 A1 | 6/2012 | Tahincioglu | |

\* cited by examiner

WIRELESS TEMPERATURE SENSING SYSTEM FOR A COOKING APPLIANCE

FIELD OF THE INVENTION

The present invention relates to cooking appliances and, more particularly, to a wireless temperature sensing system for a cooking appliance.

BACKGROUND OF THE INVENTION

Cooking appliances, and in particular electric cooking/grilling devices such as griddles, are known. One type of known grilling devices typically evidences a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of convenience, ease of use and increased functionality. As will be readily appreciated, existing grills require a user to manually determine the doneness of food items. In view the tedious nature of this process, there is a need for a cooking appliance that includes a means for automatically measuring the doneness of food items during cooking.

SUMMARY OF THE INVENTION

It is an object of the present invention to provide a cooking appliance having a wireless temperature sensing system.

It is another object of the present invention to provide a wireless temperature sensing system for a cooking appliance for detecting the internal temperature of a food item during cooking.

These and other objects are achieved by the present invention.

According to an embodiment of the present invention, a temperature sensing system for a cooking appliance includes a control unit having a receiver. The control unit and the receiver are housed within the cooking appliance. The temperature sensing system further includes a wireless temperature sensing probe having a temperature sensor and a wireless transmitter module. The wireless temperature sensing probe is configured to wirelessly communicate with the control unit housed within the cooking appliance.

According to another embodiment of the present invention a wireless temperature sensing probe for detecting the internal temperature of a food item is provided. The wireless temperature sensing probe includes a housing containing a wireless transmitter module and a shaft extending from said housing. The shaft has a distal tip and a temperature sensor positioned in the distal tip. The temperature sensor is in electrical communication with the wireless transmitter module.

According to yet another embodiment of the present invention a method of operating a cooking appliance is provided. The method includes the steps of equipping the cooking appliance with a control unit, the control unit operatively controlling a cooking surface of the cooking appliance, and providing a temperature sensing probe that selectively communicates with the control unit. The control unit controls operation of said cooking surface in dependence upon the temperature sensing probe.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
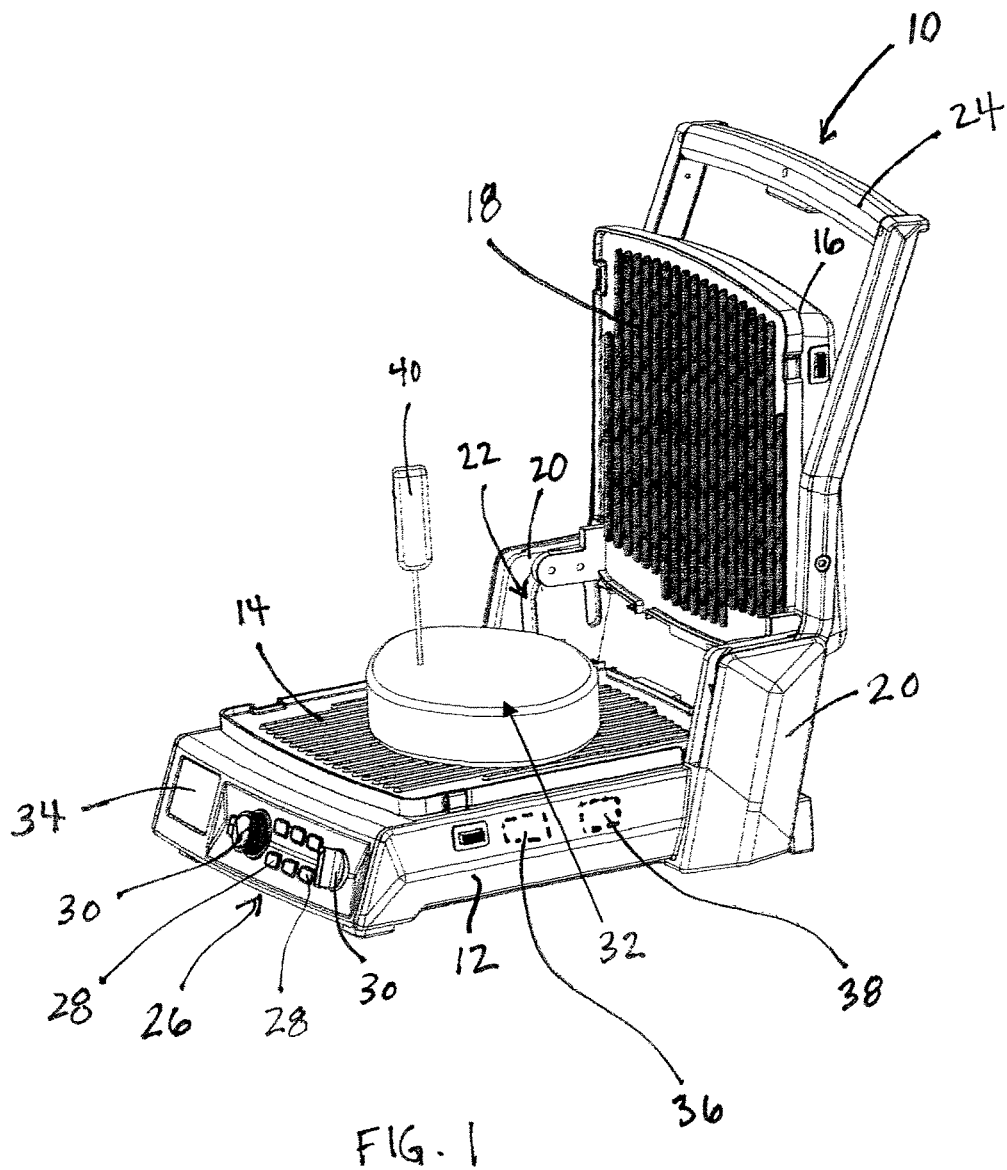
FIG. 1 is a perspective view of a cooking appliance and wireless temperature sensing probe according to an embodiment of the present invention.

Referring to FIG. 1, a cooking appliance 10 according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18. The upper housing 16 is operatively connected to the lower housing 12 via opposed frame members 20 extending from the lower housing 16. In particular, as shown therein, the upper housing 16 rides in a guide track 22 in the frame members 20. A handle 24 attached to the upper housing 16 allows a user to raise and lower the upper housing 16 in the guide track 22 in order to selectively position the upper housing 16 in various positions in relation to the lower housing 12.

As further shown in FIG. 1, the cooking appliance 10 includes a control panel 26 having an array of buttons 28 and rotatable knobs 30. The buttons 28 and knobs 30 allow a user to select and set a variety of cooking and heating parameters, for example, single sided cooking, double sided cooking and cooking duration. The parameters may also include the desired internal temperature of a food item 32 to be heated, or a desired degree of doneness, such as rare, medium, well-done, etc. An LCD screen 34 or similar visual output device on the control 26 panel allows a user to view the parameters being set, as well as to monitor the internal temperature of the food item 32 in real-time, as discussed in detail below.

The control panel 26 is electrically coupled to a control unit 36 having a printed circuit board (PCB) (not shown) contained in the lower housing 12 of the cooking appliance 10. In this manner, a user may input cooking or heating parameters specific to a particular food item 32 to be cooked, and the control unit 36 may control operation of the upper and lower heating plates 14, 18 in accordance with the input parameters. Importantly, the control unit 36 also includes a receiver 38 for receiving signals from a wireless temperature sensing probe 40, as discussed in detail hereinafter.

Figure 2:
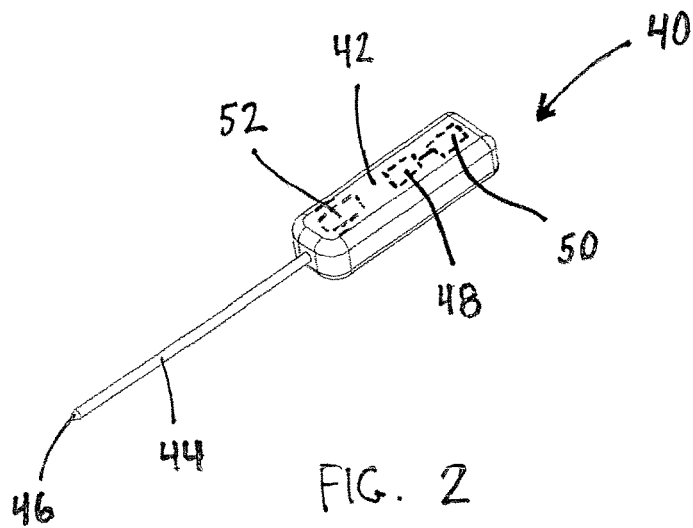
FIG. 2 is a perspective view of the wireless temperature sensing probe of FIG. 1.

With reference to FIG. 2, the wireless temperature sensing probe 40 includes a housing 42 and a piercing shaft 44 extending from the housing 42. The piercing shaft 44 terminates in a pointed, distal tip 46 that facilitates insertion into a food item 32. A temperature sensor (not shown) is housed within the distal tip 46 of the shaft 44 for sensing the internal temperature of the food item 32.

The wireless temperature sensing probe 40 also includes a PCB 48 contained in the housing 42. The PCB 48 is electrically coupled to the temperature sensor via conductive wires running through the shaft 44, and to a wireless transmitter module 50 also contained within the housing 38.

The wireless transmitter module 50 may be a radio-frequency, infrared or other type of wireless transmitter known in the art, and is configured to communicate with the receiver 38 contained with the cooking appliance 10.

As further shown in FIG. 2, the wireless temperature sensing probe 40 includes a battery, such as rechargeable battery 52, for powering the probe 40. In the preferred embodiment, the battery 52 may be recharged at the cooking appliance 10, such as, for example, by inserting the temperature probe 40 into a recharging dock (not shown) forming a part of the lower housing 12.

In the preferred embodiment, the wireless temperature sensing and control system of the present invention allows a user to precisely control the degree of doneness or temperature of food items. In particular, the wireless temperature sensing and control system includes the temperature sensing probe 40 and the control unit 36, as described above, as well as the control panel 26 on the face of the cooking appliance 10. As discussed above, the control panel 26 includes an array of buttons 28 and knobs 30 that allow a user to select and set a variety of cooking or heating parameters. For example, a user can select a desired internal temperature of the food item to be cooked, or a desired degree of doneness. The control unit is configured to control operation of the one or both of the heating plates 14, 18 in dependence upon the preset cooking or heating parameters, and in dependence upon the temperature of a food item detected by the temperature sensing probe 40.

In particular, in operation, a user can select a desired degree of doneness (e.g., rare, medium, well done) or a particular temperature utilizing the control panel 26 on the lower housing 12. Throughout the cooking or heating process, the wireless temperature sensing probe 40, inserted into the food item 32, continuously or intermittently monitors the internal temperature of the food item 32. A signal representing the detected temperature is sent to the PCB 48, and the transmitter module 50 relays the signal to the receiver 38 of the control unit 36 of the cooking appliance 10. When the wireless temperature sensing probe 40 detects the pre-set temperature, or a temperature corresponding to the desired degree of doneness as set by a user, the control unit 36 automatically turns off the heating plates 14, 18 to prevent overcooking. In addition, the control unit 36 is configured to generate an audible alert, such as a beep, after the desired temperature is reached to indicate to a user that the food item 32 is cooked to the desired doneness.

As will be readily appreciated, the cooking appliance 10 of the present invention therefore provides a level of control over the cooking or heating operations that has heretofore not been possible with existing devices. In particular, the configuration of existing cooking appliances typically requires that a user manually monitor the temperature of the food item. By automatically monitoring the internal temperature of the food throughout cooking and by controlling operation of the cooking appliance 10 in dependence upon pre-set and detected temperatures, more precise cooking, and therefore better tasting food, is possible.

In addition, the cooking appliance 10 of the present invention provides a greater level of convenience by automatically monitoring the internal temperature of a food item without requiring constant attention by a user. Moreover, the separate nature of the wireless temperature sensing probe 40 allows for more freedom in positioning the probe 40 within the food item 32 and facilitates cleaning of the probe 40.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A temperature sensing system for a double contact cooking appliance, said temperature sensing system comprising:
  an upper housing having a first heating surface configured to contact a first side of a food item;
  a lower housing pivotally connected to said upper housing and having a second heating surface configured to contact a second, opposed side of said food item;
  a control unit having a receiver, said control unit and said receiver being housed within said cooking appliance; and
  a wireless temperature sensing probe having a housing containing a wireless transmitter module and a rechargeable battery for powering said wireless temperature sensing probe, and a shaft extending from said housing and terminating in a pointed distal tip containing a temperature sensor, said wireless temperature sensing probe being configured to wirelessly communicate with said control unit;
  wherein said lower housing includes a recharging dock configured to receive said wireless temperature sensing probe for recharging of said rechargeable battery; and
  wherein said control unit is configured to control operation of at least said first and said second heating surfaces individually in dependence upon said at least one input parameter and an internal temperature of said food item detected by said wireless temperature sensing probe.

2. The temperature sensing system of claim 1, wherein:
  said wireless transmitter module is configured to wirelessly send signals indicative of a temperature detected by said temperature sensor to said receiver.

3. The temperature sensing system of claim 1, wherein:
  said wireless transmitter module is a radio-frequency transmitter module.

4. The temperature sensing system of claim 1, wherein:
  said wireless transmitter module is an infrared transmitter module.

5. The temperature sensing system of claim 1, further comprising:
  a control panel on said cooking appliance, said control panel having one or more input buttons for allowing a user to select at least one input parameter, said at least one input parameter including a desired internal temperature of a food item; and
  wherein said control panel is in electrical communication with said control unit.

6. The temperature sensing system of claim 5, wherein:
  said control unit is configured to generate an audible alert when said desired internal temperature is detected by said wireless temperature sensing probe.

7. The temperature sensing system of claim 1, wherein:
  said control unit is configured to deactivate said first and second heating surfaces when said desired internal temperature is detected by said wireless temperature sensing probe.

8. A wireless temperature sensing probe for detecting the internal temperature of a food item, comprising:
- a housing containing a wireless transmitter module, said wireless transmitter module being configured to wirelessly communicate with a receiver of a cooking appliance;
- a shaft extending from said housing, said shaft having a distal tip and a temperature sensor positioned in the distal tip; and
- a rechargeable battery contained within said housing for powering said probe;
- wherein said temperature sensor is in electrical communication with said wireless transmitter module; and
- wherein said wireless temperature sensing probe is configured to mate with a recharging dock in a lower housing of a double contact grill for recharging of said rechargeable battery.

9. The wireless temperature sensing probe of claim 8, wherein:
- said wireless transmitter module is a radio-frequency transmitter module.

10. The wireless temperature sensing probe of claim 8, wherein:
- said wireless transmitter module is an infrared transmitter module.

11. A method of operating a double contact cooking appliance, said method comprising the steps of:
- providing an upper housing having a first heating surface configured to contact a first side of a food item;
- providing a lower housing pivotally connected to said upper housing and having a second heating surface configured to contact a second, opposed side of said food item;
- equipping said cooking appliance with a control unit, said control unit operatively controlling said first heating surface and said second heating surface of said cooking appliance;
- providing a temperature sensing probe, said temperature sensing probe selectively communicating with said control unit; and
- recharging a rechargeable battery of said temperature sensing probe by inserting said probe into a recharging dock integrated with said lower housing of said double contact cooking appliance;
- wherein said control unit controls operation of said first heating surface and said second heating surface, individually, in dependence upon a temperature detected by said temperature sensing probe.

12. The method according to claim 11, wherein:
- said communication between said control unit and said temperature sensing probe is accomplished wirelessly.

13. A cooking appliance, comprising:
- an upper housing having a first heating surface, said first heating surface being selectively movable into contact with a food item;
- a lower housing pivotally connected to said upper housing and having a second heating surface, said second heating surface being selectively movable into contact with said food item;
- a control unit;
- a wireless temperature sensing probe in wireless communication with said control unit, said control unit selectively adjusting an operation of said cooking appliance in dependence upon said communication with said wireless sensor;
- wherein said wireless temperature sensor is removably housed within a recharging dock formed in one of said upper and lower housings.

14. A temperature sensing system for a double contact cooking appliance, said temperature sensing system comprising:
- an upper housing having a first heating surface configured to contact a first side of a food item;
- a lower housing pivotally connected to said upper housing and having a second heating surface configured to contact a second, opposed side of said food item;
- a control unit having a receiver, said control unit and said receiver being housed within said cooking appliance; and
- a wireless temperature sensing probe having a housing containing a wireless transmitter module and a rechargeable battery for powering said wireless temperature sensing probe, and a shaft extending from said housing and terminating in a pointed distal tip containing a temperature sensor, said wireless temperature sensing probe being configured to wirelessly communicate with said control unit;
- wherein said lower housing includes a recharging dock configured to receive said wireless temperature sensing probe for recharging of said rechargeable battery; and
- wherein said control unit controls said first heating surface and said second heating surface independent of each other, and said control unit is configured to control operation of at least said first and said second heating surfaces individually in dependence upon said at least one input parameter and an internal temperature of said food item detected by said wireless temperature sensing probe.

15. A temperature sensing system for a double contact cooking appliance, said temperature sensing system comprising:
- an upper housing having a first heating surface configured to contact a first side of a food item;
- a lower housing pivotally connected to said upper housing and having a second heating surface configured to contact a second, opposed side of said food item;
- a control unit;
- a wireless temperature sensing probe being configured to wirelessly communicate with said control unit;
- wherein said lower housing includes a recharging dock configured to receive said wireless temperature sensing probe for recharging of said rechargeable battery.

* * * * *